United States Patent Office 2,924,375
Patented Feb. 9, 1960

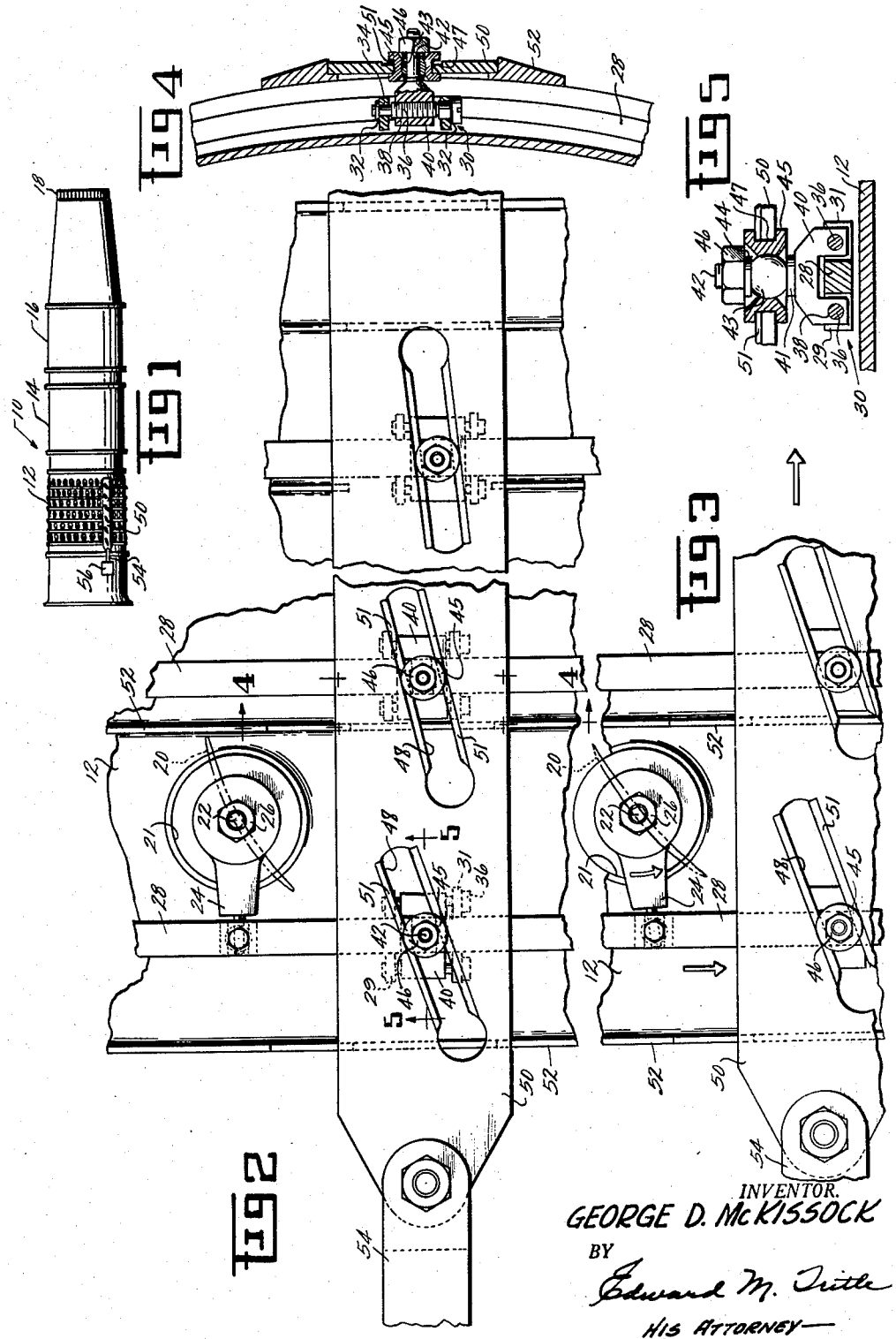

2,924,375

POSITIONING DEVICE

George Dawson McKissock, Panama City, Fla., assignor to General Electric Company, a corporation of New York Application May 18, 1955, Serial No. 509,307

2 Claims. (Cl. 230—114)

This invention relates to a turbomachine and in particular to an axial flow compressor for a turbojet engine.

In order to obtain more thrust and higher efficiency from a turbojet engine, it is desirable to have a high pressure ratio compressor for the engine. This is due to the fact that when air is taken on board the engine, the air is compressed and then passes downstream to the combustion chambers for the combustion process. The hot gases then pass through the turbine and outwardly through the exhaust nozzle. The amount of thrust is determined by the velocity of the issuing jet. The higher the air can be compressed, the more thrust becomes available to the engine since the velocity of the issuing jet can be greatly increased. However, when a high pressure ratio compressor is used, stall characteristics occur during various stages of increasing speed of the engine. In order to prevent the stall characteristics from occurring, it is desirable to incorporate stator vanes which are adapted to be varied so as to provide the correct airfoil position for the particular velocity of flowing air. Operating characteristics of the compressor are improved by this method of controlling the running conditions of the engine by changing the direction of quantity of airflow. It is therefore an object of this invention to provide a multiple positioning and scheduling device for actuating the angles of attack of one or more stages, or rows, of variable vanes in an axial flow compressor simultaneously according to a predetermined relationship.

In order to eliminate the stall characteristics in high pressure ratio compressors, the stages of stator vanes of the compressor must be rotated a different amount. It also becomes desirable to position the stages of stator vanes by varying amounts simultaneously according to a predetermined schedule. It is therefore another object of this invention to rotate each stage of stator vanes of a compressor by different amounts, simultaneously, and according to a predetermined schedule relative to each other.

It is still another object of this invention to provide a device for varying the position of the stator vanes of a compressor of an aircraft gas turbine by a sensitive linkage arrangement in which each actuating band is operated by a longitudinally moving actuator arm in which slots are provided at different angles to the axis of the compressor so that the amount of turning movement of the stator vane is governed by the angle of the slot with respect to the axis of the compressor.

These and other objects will become more apparent when read in the light of the accompanying drawing and specification wherein like parts have like numbers, and wherein, the parts are intended to be as generic in their application as the prior art will permit, and wherein;

Figure 1 is a view of a normal turbojet engine having mechanism for varying the stator vanes, Figure 2 is a view in broken sections showing the position of the actuator arm having slots therein for actuating the actuator bands, Figure 3 is a plan view in broken section showing the actuator arm moved longitudinally so as to actuate the actuator bands, Figure 4 is a cross-sectional view taken on lines 4—4 of Figure 2 showing the manner in which the actuator arm and slots are positioned relative to the casing, and Figure 5 is a cross-sectional view taken on lines 5—5 of Figure 2.

Briefly stated, and according to one aspect of my invention, a means is provided for rotating the stages of stator vanes of a compressor in a turbojet engine simultaneously and according to a predetermined schedule to provide the correct angle of attack to the stator vanes for the particular flight condition. The means comprises a guide plate having cam slots therein for actuating followers which in turn operate actuating bands and lever arms for rotating the stator vanes. The cam slots are at different angles so as to rotate the stages of stator vanes by different amounts. Also, means are provided for permitting the follower and cam slots to move in different planes without causing binding between the parts. In addition, an adjusting arrangement is provided to set the angle of attack of the stator vanes at their initial zero position and thereby compensate for manufacturing tolerances.

Referring to the figures, the numeral 10 generally designates a turbojet engine having a compressor 12, combustion section 14, turbine section 16, and exhaust nozzle 18. The compressor casing 12 is provided with a plurality of stator vanes 20, rotatably mounted in the openings 21 of the casing by any well known means. The vanes 20 are provided with studs 22 so as to be fixed to the lever arm 24 by use of nuts 26 or the like. Any well known method such as welding or the like can be used for fixing the lever 24 to the base of the stator vanes 20. The lever 24 is pivotally connected to the actuator band 28 by a universal joint or the like or by means such as shown in Patent No. 2,842,305 assigned to the assignee of the present application. The actuator bands 28 are provided with a bracket generally indicated at 30 and best seen in Figures 4 and 5. The bracket 30 comprises a pair of arms 29 extending from one side of the actuator band 28 and another pair of arms 31 extending from the other side of the actuator band. The arms are provided with openings 32 in which are journaled worms or the like 36, the purpose of which will be hereinafter more fully explained. The worms 36 extend through threaded openings 38 in the legs of a yoke assembly 40. The yoke assembly 40 is positioned between the arms 29 and 31 of bracket 30.

The yoke assembly 40 is provided with a stud 42 terminating in a threaded portion. A washer 41 is slidably mounted over the stud 42 along with a ball 43 and another washer 44 which are tightly locked in place by a lock nut or the like 46. A follower 45 is provided with a socket so as to be universally mounted on the ball 43.

The follower 45 has a circumferential groove 47 so as to be slidable in a cam slot 48, there being one follower and one cam slot for each stage of stator vanes. The cam slots are formed in the guide plate 50 and are at a slightly different angle from each adjacent stage, the purpose of which will be hereinafter more fully explained. Also, since the guide plate 50 moves in a longitudinal direction and the follower 45 moves in a circumferential direction as well as longitudinal, and since the yoke assembly remains in a radial direction, the tendency is for the yoke assembly to pull away from the guide plate 50. Binding between the follower and guide plate would result. Accordingly, as best seen in Figure 4, the marginal edges of the cam slots are machined down so as to provide a clearance 51 between the groove 47 of the follower 45 and guide plate 50. The guide plate 50 is slidably mounted on the compressor casing by guides 52 positioned on either side thereof. The guide plate 50 is pivotally connected to an actuating arm 54 for moving the guide plate in a fore and aft motion. The actuator arm 54 is in turn connected to an actuating mechanism 56 which can be either of the mechanical hydraulic or the electro-mechanical type or mechanical pneumatic type. The actuator mechanism 56 can be responsive to such parameters as speed, temperature and pressure at various portions of the jet engine through various control systems for picking up and supplying the necessary signals.

The yoke assembly 40 is adjustably mounted on the worms 36 to position each stage of stator vanes at their initial predetermined position. Due to the build-up of manufacturing tolerances of the various parts, correction becomes necessary. This correction can be accomplished by turning the worm 36.

Since each stage of stator vanes are moved simultaneously by a different amount and according to a predetermined schedule, the cam slots must have a different angle for each stage. This will actuate the followers 45, and accordingly, the actuator bands 28 by different amounts so as to ultimately rotate the stages of stator vanes by different amounts.

Whenever the actuator arm 54 is moved in response to one of the parameters such as speed, temperature or pressure, the guide plate 50 is moved in a direction parallel to the axis of the compressor. Since the cam slots 48 are at different angles for each stage the circumferential movement of the followers 45 will be of a different amount thereby rotating the actuating bands 28 by different amounts. The actuating bands translate their movement to the lever arms 24 so as to rotate the stator vanes simultaneously according to a predetermined schedule as represented by the angle of the cam slots. To accommodate the rotational directions of the follower and the translatory movement of the cam slots the follower clearance is provided between the groove 47 and guide plate 50. Also, the follower is universally mounted on the stud 42. As the guide plate is moved longitudinally of the casing the follower 45 will move up or down on the stud 42 depending on the direction of movement of the guide plate 50. The manner in which the follower is mounted permits the follower to move without binding even though the cam slot 48 and the actuator band 28 move in different planes.

Therefore, a novel arrangement is provided in which each actuator band can be rotated a different amount by the movement of the followers in the cam slots being moved a different amount for each stage. Further, in order to take care of any manufacturing tolerances that may be created in a number of parts used, the follower in each of the cam slots can be adjusted by means of the threaded worms 36 in the threaded apertures 38 of the yoke 40.

The above embodiment has been described as an illustration of the above invention and is not intended as a limitation thereof. Many modifications can be made to the above invention without departing from the spirit and scope thereof and are intended to be regarded as equivalents thereof.

What I claim as new and desire to secure by Letters Patent of the United States is:

1. A compressor having a plurality of stages of rotatably mounted stator vanes, actuator means, a guide plate connected to said actuator means, said guide plate having a plurality of cam slots therein, said cam slots being at different angles to the longitudinal axis of the guide plate, followers for each of said slots, there being one follower and one slot for each stage of stator vanes, said followers being slidably mounted in said slots, each follower being connected to an actuator band for the actuation thereof, there being one actuator band for each stage of stator vanes, means for adjusting the followers in a circumferential direction so as to initially position the stator vanes, lever arms fixed to said stator vanes, and means connecting said lever arms to said actuator bands for the actuation of the stator vanes, whereby movement of said guide plate in a longitudinal direction with respect to the compressor translates such motions through the cam slots and cam followers to the actuator bands and lever arms so as to simultaneously rotate the stages of stator vanes different amounts with respect to adjacent stages of stator vanes.

2. In an axial flow compressor comprising a plurality of adjustable mounted stages of stator vanes, lever arms fixed to the base of each of the stator vanes, an actuator band for each stage of stator vanes connected to the lever arms, a follower adjustably mounted on each actuator band so as to initially position each actuator band with respect to each other, and a guide plate extending longitudinally of the compressor provided with cam slots therein for receiving the followers, each follower having a circumferential groove which is wider than the thickness of the marginal edges of the slot in the guide plate and tightly fitting the sides of the slot in the guide plate.

References Cited in the file of this patent
UNITED STATES PATENTS

| | | |
|---|---|---|
| 1,456,699 | Kramer | May 29, 1923 |
| 2,371,706 | Planiol | Mar. 20, 1945 |
| 2,718,349 | Wilde | Sept. 20, 1955 |

FOREIGN PATENTS

| | | |
|---|---|---|
| 621,175 | Great Britain | Apr. 5, 1949 |